Figure 1:
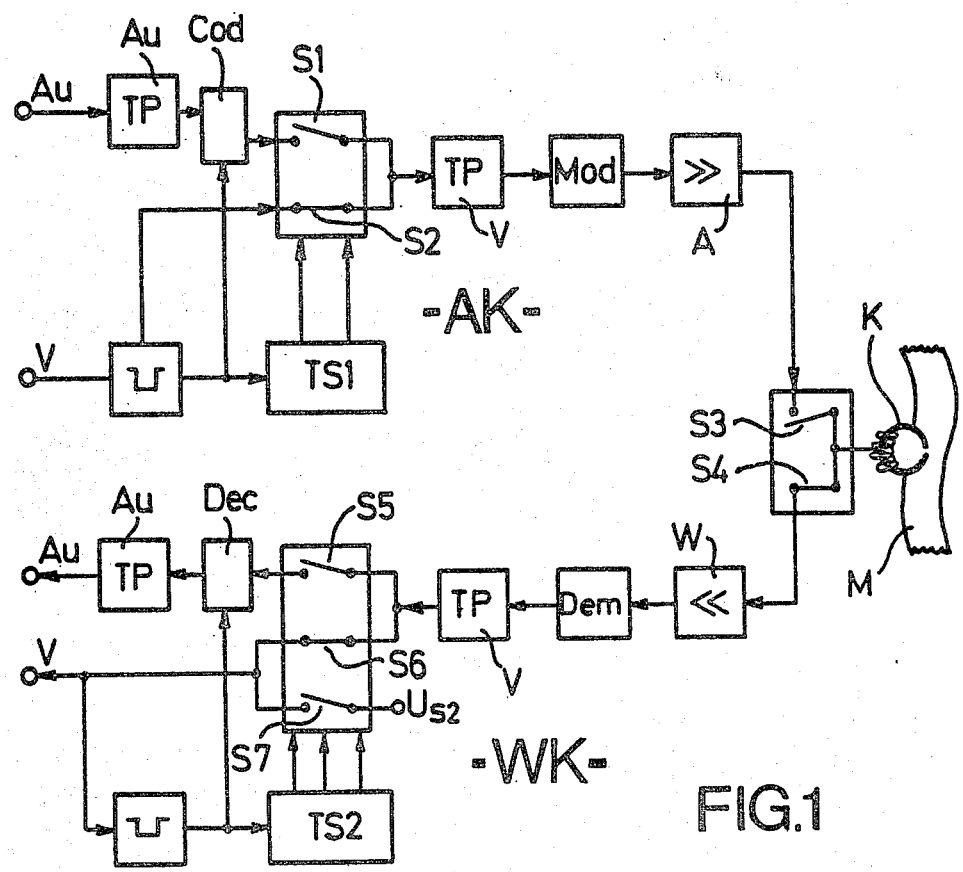

United States Patent [19]

Ilmer et al.

[11] Patent Number: 4,479,150
[45] Date of Patent: Oct. 23, 1984

[54] METHODS AND ARRANGEMENTS FOR CHANGING THE AUDIO INFORMATION IN AN AUDIO/VIDEO RECORDING/REPRODUCTION SYSTEM

[75] Inventors: Andreas Ilmer, Ludwigshafen; Karl Andreae, Beindersheim, both of Fed. Rep. of Germany

[73] Assignee: BASF Aktiengesellschaft, Ludwigshafen, Fed. Rep. of Germany

[21] Appl. No.: 317,265

[22] Filed: Nov. 2, 1981

[30] Foreign Application Priority Data

Nov. 8, 1980 [DE] Fed. Rep. of Germany ....... 3042269

[51] Int. Cl.$^3$ .......................................... H04N 9/491
[52] U.S. Cl. .................................. 358/310; 358/145; 358/147; 358/343
[58] Field of Search ............... 358/310, 335, 341, 343, 358/143, 144, 145, 147, 12, 13, 311; 360/19.1, 14.1

[56] References Cited

U.S. PATENT DOCUMENTS 3,723,637 3/1973 Fujio et al. ......................... 358/145
4,246,615 1/1981 Shiraishi et al. .................... 358/145
4,303,950 12/1981 Taniguchi et al. ................. 360/19.1

Primary Examiner—Richard Murray
Attorney, Agent, or Firm—Keil & Weinkauf

[57] ABSTRACT

The invention relates to methods and circuit arrangements for changing the audio information in an audio/video recording/reproduction system and particularly in a color video system wherein the audio signals are inserted as sampling pulses of a time-multiplex system into the color video signal and particularly into a blanking interval of the signal and the recorded original audio signal is overwritten by a new audio signal. In preference the horizontal blanking interval of the video signal is used for this purpose, and in the case of a color video signal the color burst is displaced to the bottom of the horizontal blanking interval in order to free the back porch of the horizontal blanking interval for the audio signal. The circuit arrangements according to the invention contain corresponding circuit units which are suitably matched to the measures of the methd. The invention can be preferably used for color video systems without losing recording capacity on the recording medium.

15 Claims, 6 Drawing Figures

METHODS AND ARRANGEMENTS FOR CHANGING THE AUDIO INFORMATION IN AN AUDIO/VIDEO RECORDING/REPRODUCTION SYSTEM

The invention relates to methods and arrangements for changing the audio information in an audio/video recording/reproduction system in which the audio signals are inserted into the video signal in the form of sampling pulses of a time-multiplex system.

The principle of transmitting audio signals within the video signal and particularly within the television signal in a time-multiplex process is familiar. Although space for accommodating such audio signals can be created anywhere in the video signal or in the vertical blanking interval by compression and expansion techniques, it is expedient to use the horizontal blanking interval. For this purpose the method of converting the audio information, which is present in analog form, as modulated pulses and in detail in accordance with the pulse-amplitude, pulse-phase or pulse-code or pulse-width modulation method is also familiar (see, for example, Funkschau 1967, volume 1, page 13).

In magnetic-tape recording/reproduction systems in which the information is recorded on separate tracks, the possibility exists of providing one or several separate audio tracks. However, this has the disadvantage of reduced recording capacity for video signals and must therefore be avoided for home video recording/reproduction systems in which a minimum of tape consumption is desired. In principle, the possibility also exists of combining video and audio signals and recording them on a common magnetic track. With this method, however, the disadvantage is accepted that a change or new version of the audio information, called "dubbing", without influencing the video information, can be carried out only by elaborate efforts by means of a second video recording unit or by reproducing, changing and rerecording at another location on the tape than the one at which the original audio signal was recorded.

In order to save recording capacity on the recording medium, it is surprisingly advantageous for video recording/reproduction systems using the helical scan or longitudinal scan recording technique to accommodate the audio information in the horizontal blanking interval.

It is an object of the present invention to provide simple methods and arrangements for changing the audio information in order to make dubbing possible without any great effort in the said video recording/reproduction systems.

According to the invention, this object is achieved by a method for changing the audio information in an audio/video recording/reproduction system in which the audio signals are inserted into the video signal in the form of sampling pulses of a time-multiplex system, in which video signal the original audio signal recorded on the recording medium is overwritten by a new audio signal.

It is known in principle (for example from German Offenlegungsschrift DOS No. 2,457,636) that the sound information can be recorded by means of a separate inclined gap audio head by overwriting the video information. This process presents the problem of properly separating the video and audio signals from one another during reproduction and, if required, of suppressing the original audio signals. In addition, it is known for magnetic tape recordings (German Auslegeschrift DAS No. 1,071,367) that during the audio recording process, a signal can be recorded which is additional to a basic signal recording on a magnetic tape, by recording the additional signal on a part of the track width of the basic signal recording. In practice, the adding of the additional signal recording is thus carried out by part-overwriting of the basic signal recording with reduced track width and/or displaced with respect to the track position of the basic signal recording by means of two recording heads which are fixed in location or of a single recording head which is vertically displaceable. Such overwriting presupposes a separate recording the video and audio signals on different magnetic tracks.

The object of the invention is achieved with the aid of an arrangement in which the recording channel is provided with an FM modulator and at least one synchronizing signal separator is provided if switches are connected between the audio and video signal inputs and the FM modulator and timing elements are provided between the one or more synchronizing signal separators and the switches and the FM modulator for the purpose of inserting the audio signal at the correct time into the horizontal blanking interval of the video signal.

In addition, if an FM demodulator and a synchronizing-signal separator are provided in the reproduction channel of the recording/reproduction system, the arrangements contains in accordance with the invention switches between the FM demodulator and the audio and video signal outputs and timing elements between the synchronizing-signal separator and the switches for time-controlling these switches in the reproduction mode of the recording/reproduction system.

In addition, the recording/reproduction changeover switch is also time-controlled by the timing elements. Summarizing the characteristics of the arrangement, therefore, only a few additional circuit stages are required for providing the facility of adding signal dubbing.

According to the invention, the timing elements control the duration and the position in time of the sampling pulse or pulses during recording, reproduction and dubbing.

In the case of a color video signal recording/reproduction system, a circuit for detecting the color burst signal on the back porch of the horizontal blanking interval and a circuit for shifting the color burst signal into the bottom of the synchronizing signal and a circuit for replacing it into the original position on the back porch of the horizontal blanking interval can advantageously be provided, or must be provided, for example with narrow track recording.

This also makes the arrangement according to the invention advantageously usable for color video recording/reproduction systems.

In an advantageous further development of the method according to the main claim, the sampling pulses can be inserted into a blanking interval and particularly into the horizontal blanking interval of the video signal, and the recorded audio signal in the blanking interval or the horizontal blanking interval is overwritten by the new audio signal and thus renewed or changed.

In a further development of the method, the changing of the audio signal can be carried out whilst operating the system in reproduction mode by switching it over during the horizontal blanking interval to the recording mode, during which time the overwriting is carried out.

The audio signal can advantageously be a pulse-amplitude modulated signal (PAM signal). On the other hand, it can also be advantageous to form the audio signal into a pulse-phase or pulse-code modulated signal by which means, if necessary, several audio channel frequency bands could be accommodated on the back porch. In terms of circuit design, the switching over to recording mode can be controlled by means of detecting the horizontal synchronizing pulses.

According to the invention, with a color video recording/reproduction system it is advantageous, and necessary with narrow tape systems, to displace the color burst from the back porch of the horizontal blanking interval into the bottom of the horizontal synchronizing signal which increases, for example, the available frequency band width or the signal/noise ratio.

Figure 2:
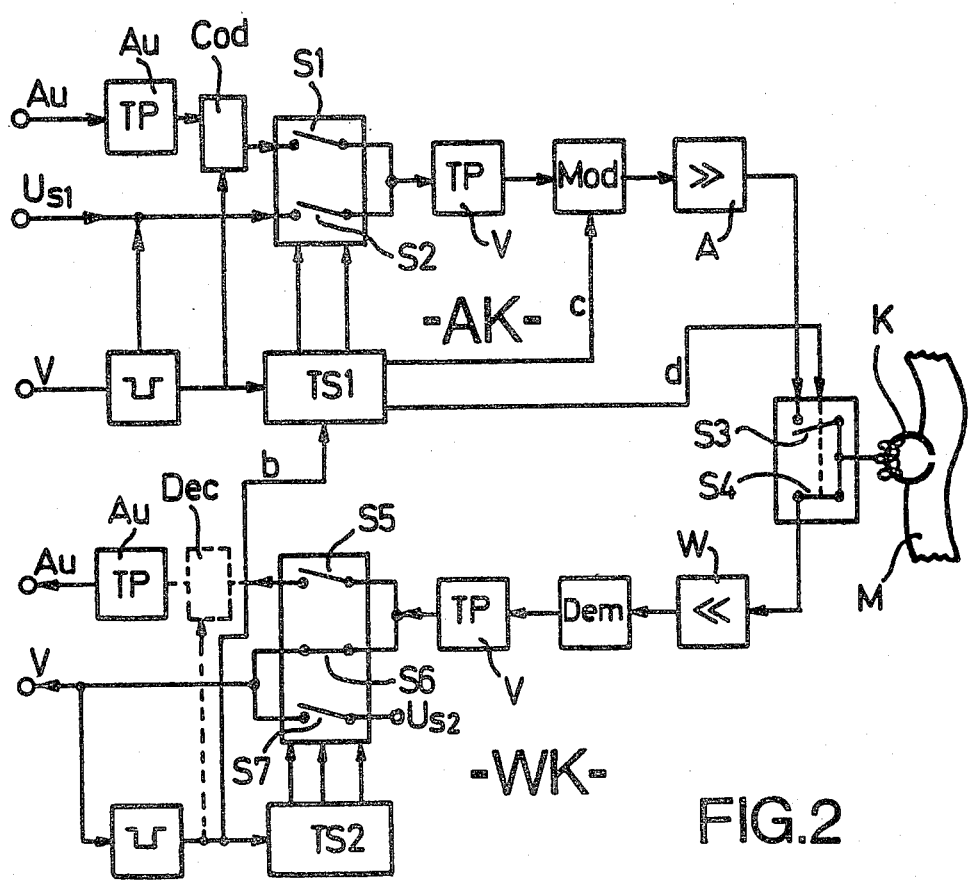
Figure 3A:
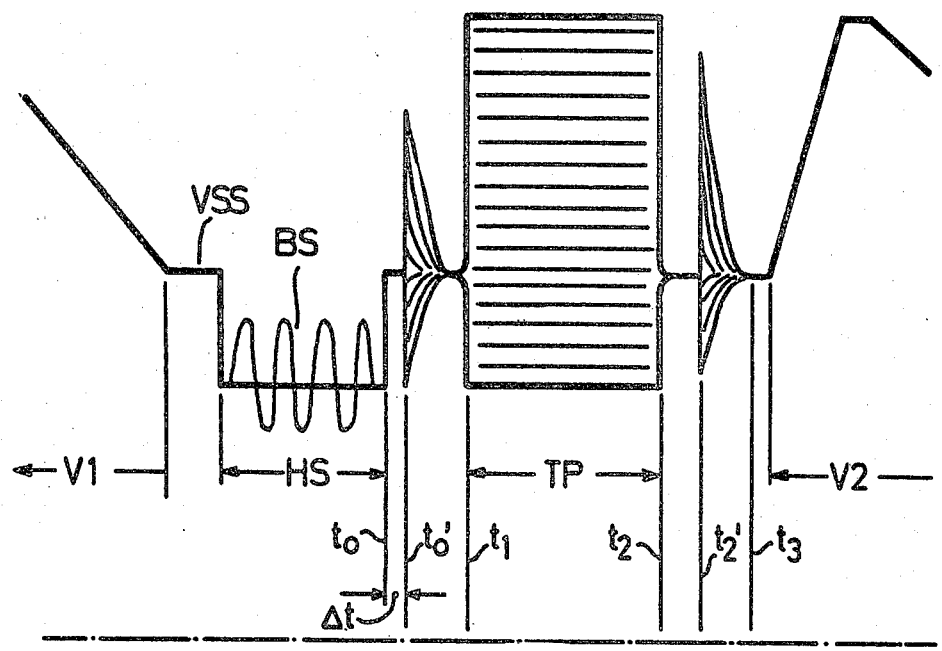
Figure 3B:
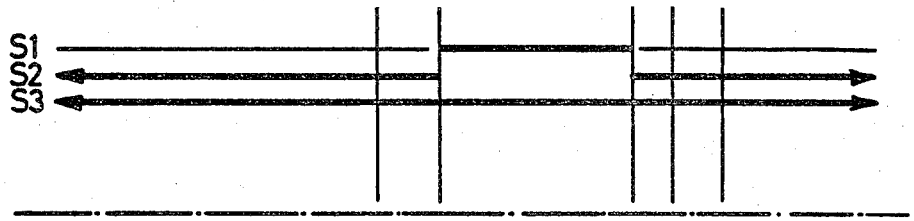
Figure 3C:
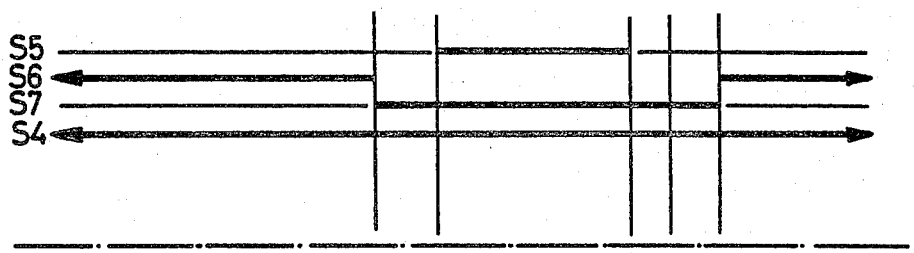
Figure 3D:
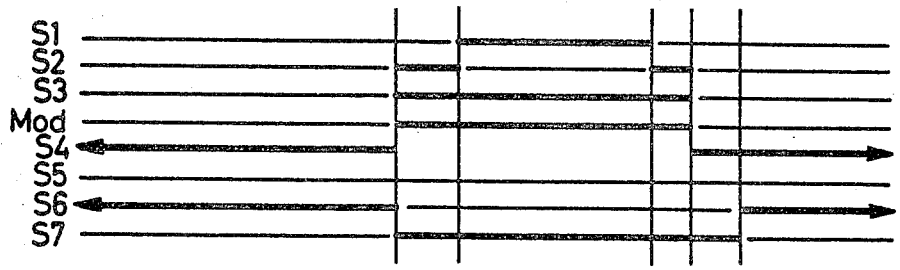

Details of the novel features of the methods and arrangements can be found in the description which follows of a circuit example represented in the drawing, in which:

FIG. 1 shows a block diagram of the recording/reproduction channels of a magnetic tape recording/reproduction system according to the invention, FIG. 2 shows a block diagram of the magnetic tape recording/reproduction system according to FIG. 1, modified for "dubbing" mode, FIG. 3a shows a schematic signal diagram, the audio signal being present as a PAM signal and the color burst being displaced, FIG. 3b shows a switching diagram for the "recording" mode of operation, FIG. 3c shows a switching diagram for the "reproduction" mode of operation, and FIG. 3d shows a switching diagram for the "dubbing" mode of operation.

FIG. 1 shows the magnetic tape recording/reproduction system diagrammatically without color channel. In broad terms, it consists of the recording channel AK, the magnetic recording/reproduction head K, the magnetic tape M and the reproduction channel WK.

In recording mode, an audio signal Au and a video signal V (which can also be a color video signal) are present at the input of the recording channel AK. The audio signal is limited via the low-pass filter TPAu, the cut-off frequency of which is selected in accordance with the particular sampling frequency used. The output signal of the low-pass filter is fed to the switch S 1. After clamping off a voltage value of the horizontal synchronizing signal (HS), hereinafter briefly called "sync", and subsequent separation of the sync signal, the video signal V is also fed to a switch S 2. The switches S 1 and S 2 are followed by a lowpass filter TPV with a suitable cut-off frequency of, for example, 3 MHz for the video signal V, a frequency modulator Mod and a recording amplifier, the latter feeding the frequency modulated combined audio/video signal via the recording switch S 3 to the recording/reproduction head k so that it is recorded on the tape M.

The reproduction channel WK begins with the reproduction switch S 4 to which is connected the reproduction amplifier W. The output of the amplifier W is connected to the FM demodulator Dem which is followed by a low-pass filter TPV to which is connected a switching unit S 5 to S 7. S 5 switches the audio signal Au to be reproduced via a low-pass filter TPAu to the audio output of the system. Switch S 6 switches the video signal V to the video output of the system and the latter is also connected to a sync separator. In both channels AK and WK, a time control unit TS is located between the sync separators and the respective switching unit and effects the time control represented in the diagram of FIG. 3.

FIG. 3a is a representation in principle of a horizontal television line with the sync signal HS and the horizontal blanking interval.

From left to right, the video information V 1 is followed by the front porch VSS, the sync tip and the back porch HSS which form the sync pulse HS. The total line period suitable for accommodating the audio signal is the period from time $t_0$ of the rear sync pulse edge to the beginning $t_3$ of the new line with the video information $V_2$.

The switches, sync separators and time control units have the task of inserting the audio signals into this signal area during recording or dubbing or of retrieving them again during reproduction.

The audio signal is recorded in the sampling pulse form. For this purpose, the analog audio signal is converted into sampling pulses by means of a suitable sampling frequency. The line frequency or a multiple of the line frequency offer themselves as a frequency for this purpose. When the sampling frequency is doubled, the band width of the insertable audio signal is also doubled. If the line frequency of 15.625 KHZ is used as a sampling frequency, a theoretical audio signal frequency band width of 7.813 KHz and, in practice, approximately 6.5 KHz is obtained.

The conversion into sampling pulses is carried out, for example, in accordance with FIG. 3a by means of pulse-amplitude modulation (PAM) but pulse-phase or pulse-width modulation can also be used. If sufficient band width is available in the recording/reproduction system, it is also advantageous to use pulse-code modulation (PCM) methods for improving the sound quality and for increasing the number of audio channels.

During recording mode, the audio sampling pulses are inserted in a controlled manner by means of the switches S 1 and S 2 into the horizontal blanking interval or, more accurately, on the back porch HSS. At time $t_0$ the sync separator makes available the appropriately delayed front, rising edge of the sync signal HS. The switch S 1 is activated after a suitable delay $\Delta t$ at time $t_0$ via the time control unit TS. The switches S 1–S 7 can be electronic switches, such as, for example, multivibrator circuits.

The switching time of about 1 $\mu$s described below corresponds to the period from $t_{0'}$ to $T_1$, in which in practice a noise pulse SP occurs.

From time $t_1$ to time $t_2$ the audio sampling pulse is keyed in, the longest possible period being selected in order to keep the audio signal/noise ratio as great as possible. After time $t_2$ the switch S 1 is switched off and the switch S 2 is switched on, which creates another noise pulse SP after which, however, the video signal is passed. By means of this switch control, the video signal is transferred during the visible line portion, and the audio sampling value during the dark period, to the FM modulator Mod and recorded after amplification by means of the head K on the tape M.

Diagram 3b shows the theoretical switch positions up to time $t_1$: switch S2 "on"— transmission of video signal $V_1$ to the FM modulator then at time $t_1$:
    switch S 2 "off"
    switch S 1 "on"—transmission of the audio sampling pulse or pulses, at time $t_2$:

switch S 1 "off"
switch S 2 "on+"
Switch S 3: "on", that is to say in recording position.

The "on" position in each case has been marked with thick lines.

After the recording process has been completed, the audio sampling pulse has thus been recorded on the back porch HSS of the video signal as an FM signal by means of a single head K on one track of the tape M. The signal sampled during closure of the switch S 4 from the tape M via the head K and reconstituted via the amplifier W, the FM demodulator Dem and the low-pass filter TPV is fed to the switches S 5 and S 6 where the audio and video signal paths are separated from each other. The switching processes are controlled by detecting the sync pulse via the sync signal separator and the time control unit TS 2 in accordance with the timing diagram in FIG. 3c. The audio signal is then fed between times $t_1$ and $t_2$ to the low-pass filter TPAu and during the remaining periods the video signal V is present at the video output. Over the period of several lines, a continuous audio signal Au is recovered through the low-pass filter. In order to complete the video signal and particularly the horizontal blanking interval, a voltage value US 2 corresponding to the black level is keyed in again approximately parallel to the reproduction of the Au signal in accordance with the original duration of the back porch. The individual switching times can be seen in FIG. 3b.

FIG. 2 shows a block diagram which has been modified for dubbing, which is why only the differences will be described.

The dubbing of the audio sampling pulse or pulses located on the back porch is carried out by overwriting the storage location on the magnetic tape M at a high enough level so that the original signal is completely masked.

The dubbing mode of operation is carried out in accordance with FIG. 2 in the reproduction mode of operation, a switch-over into recording mode being effected for the dubbing process proper as will be explained below. All switching functions in the recording and reproduction channel in FIG. 2 are controlled by the sync pulse detected in the reproduction signal in accordance with the timing diagram shown in FIG. 3d.

For the dubbing in accordance with FIG. 2, a dubbing signal Au is present in analog signal form at the audio input. There is no signal V present at the video input. However, a voltage source for the black level voltage $US_1$ is applied to the connecting line from the sync separator to the switch S 2. Between the sync separator of the WK channel and the time control unit TS 1 in the AK channel a connecting line b exists, which advantageously is designed to be breakable. In addition, from the time control unit TS 1 there exist both a control connection c to the FM modulator Mod and a control connection d to the switches S 3 and S 4. Due to the great differences in levels at the video head between recording and reproduction mode, overmodulating and transient effects occurring during switching which are represented as noise pulses SP cannot be avoided. The noise pulses SP occur only during the dubbing mode, that is to say by way of switches S 3 and S 4.

In principle, the dubbing takes place, starting from reproduction mode (switch S 4 "on"), by switches S 2, S 3 and S 7 being closed at time $t_o'$ and the FM modulator being activated and the dubbing signal being fed to the FM modulator by closing the switch S 1 so that the FM audio sampling signal is recorded on the tape in the period $t_1$ to $t_2$.

The voltage value US 1 is keyed via the switch S 2 in the channel AK during the times $t_o'$ to $t_1$ and $t_2$ to $t_2'$ and the voltage value $US_2$ in the channel WK during the period $t_o'$ to $t_3$.

Theoretically it is also advantageously possible to leave the oscillator of the FM modulator continuously switched on in the dubbing mode and only to switch in the output of the amplifier A via the time control unit TS during the period $t_o'$ to $t_2$.

The audio sampling values in the pulse-phase, pulse-width or pulse-code method can be produced by modifying the circuits described which can be implemented without difficulties by the skilled worker. Thus, for example, the amplitudes of the audio signal can be converted by means of a voltage-controlled monostable multivibrator into pulses of different phase angle or width. The modules Cod in the recording channel and Dec in the reproduction channel provide for suitable coding and decoding of the audio signals.

The time control units TS 1 and TS 2 can be implemented by all types of time switches or delay devices, for example by monostable multivibrators. TS 1 and TS 2 must be of different designs in order to compensate for the unequal signal paths.

If the video signal V is a color video signal, familiar burst-separating circuits can be used in the recording channel AK to separate the color burst from the back porch and to insert it into the sync tip by regenerating the burst and inserting it. However, the burst must be keyed back onto the back porch before the video signal output.

The arrangements described have been successfully tested in practice by means of a longitudinal recording system and have produced the following technical characteristics with a narrow tape recording/reproduction system up to 3 MHz: with a video signal/noise ratio (weighted) of 48 dB and original sound recording, an audio signal/noise ratio (weighted) of approximately 50 dB and with dubbing a maximum loss of approximately 1 dB was obtained.

We claim:

1. A method for changing the audio information in an audio/video recording/reproduction system in which the audio/video signals are recorded on or reproduced from longitudinally extending tracks of a magnetic tape recording/reproduction system and in which the audio signals are inserted in the form of sampling pulses of a time-multiplex system into a blanking interval of the video signal, wherein the original audio signal recorded on the recording medium in the blanking interval is overwritten by a new audio signal.

2. A method as claimed in claim 1, wherein the changing of the audio signal is effected in the reproduction mode of operation of the recording/reproduction system by a short time switching-over to recording mode, during which time the overwriting is carried out.

3. A method as claimed in claim 1, wherein the switching-over into recording mode is controlled by means of synchronizing pulses of the reproduced video signal.

4. A method as claimed in claim 1, wherein the original audio signal is in the form of a pulse-amplitude modulation signal.

5. A method as claimed in claim 1, wherein the original audio signal is in the form of a pulse-phase modulation signal.

6. A method as claimed in claim 1, wherein the original audio signal is in the form of a pulse-width modulation signal.

7. A method as claimed in claim 1, wherein the original audio signal is in the form of a pulse-code modulation signal.

8. A method for changing the audio information in an audio/color video recording/reproduction system in which the audio/video signals are recorded on or reproduced from longitudinally extending tracks of a magnetic tape recording/reproduction system and in which the audio signals are inserted in the form of sampling pulses of a time-multiplex system into the color video signal, the sampling pulses of the time-multiplex system being inserted into the horizontal blanking interval of the color video signal, wherein the original audio signal recorded on the recording medium in the horizontal blanking interval is overwritten by a new audio signal in that in the reproduction mode of operation of the recording/reproduction system a short-time switching-over to recording mode is effected during which time the overwriting is carried out and wherein during recording the color burst is displaced from the back porch of the horizontal blanking interval into the bottom of the horizontal synchronizing signal and during reproduction the color burst is replaced into its original position.

9. A method as claimed in claim 8, wherein the duration of the horizontal synchronizing signal is shortened during recording and extended again to its original duration during reproduction.

10. An arrangement for changing the audio information in an audio/video recording/reproduction system in which the audio signals are inserted in the form of sampling pulses of a time-multiplex system into a horizontal blanking interval of the video signal and which comprises a recording channel having audio and video signal inputs and a reproduction channel having audio and video signal outputs and which further comprises in the recording channel at least one synchronizing signal separator and one FM modulator, wherein switches are connected between the audio and video signal inputs and the FM modulator and timing elements are arranged between said at least one synchronizing signal separator and the switches and the FM modulator for the insertion of the audio signal at the correct time into the horizontal blanking interval of the video signal and wherein there are also provided a burst separator circuit for, during recording, separating the color burst from the back porch of the synchronizing signal and a burst generator circuit for producing a new color burst for insertion into the bottom of the synchronizing circuit and wherein during reproduction said burst separator and burst generator circuits separate, regenerate and replace the color burst on said back porch of the synchronizing signal.

11. An arrangement as claimed in claim 10, wherein further an FM demodulator and a synchronizing signal separator are provided in the reproduction channel, and between the FM demodulator and the audio and video signal outputs switches are provided, and between the synchronizing signal separator and the switches timing elements are connected for time-controlling the switching operation of the switches in the reproduction mode of the recording/reproduction system.

12. An arrangement as claimed in claim 11, wherein, if the video signal is a color video signal, circuits are provided for detecting the color burst signal on the back porch of the horizontal blanking interval and for displacing, during recording, the color burst signal into the bottom of the synchronizing signal, and a circuit is also provided for replacing, during reproduction, the color burst signal into its original position on said back porch of the horizontal blanking interval.

13. An arrangement as claimed in claim 10, wherein between the recording and reproduction channels a recording/reproduction switch is provided which is also time-controlled by said timing elements.

14. An arrangement as claimed in claim 10, wherein the duration and the position in time of the sampling pulses are controlled by said timing elements.

15. An arrangement as claimed in claim 10, wherein during dubbing the switches in the recording and reproduction channels and the recording/reproduction switch are time-controlled by the synchronizing signal separator in the reproduction channel via the timing elements.

* * * * *